United States Patent [19]

Bieler

[11] Patent Number: 5,930,506

[45] Date of Patent: Jul. 27, 1999

[54] DATE FORMAT CONVERSION FOR INCLUDING CENTURY INFORMATION IN A SIX DIGIT DATE REPRESENTATION

[76] Inventor: Roman Bieler, Hovdingavagen 2, S-183 73 Taby, Sweden

[21] Appl. No.: 08/921,709

[22] Filed: Sep. 2, 1997

[51] Int. Cl.⁶ .............................. G06F 17/30; G06F 9/44
[52] U.S. Cl. ............................... 395/704; 707/101; 707/1
[58] Field of Search ................................. 395/704; 707/1, 707/100, 104, 6; 368/231, 29; 341/81–86; 364/768–772; 705/5–9

[56] References Cited

U.S. PATENT DOCUMENTS

| | | | |
|---|---|---|---|
| 5,222,052 | 6/1993 | Salame | 368/28 |
| 5,600,836 | 2/1997 | Altar | 395/612 |
| 5,630,118 | 5/1997 | Shaughnessy | 395/601 |
| 5,644,762 | 7/1997 | Soeder | 395/606 |
| 5,668,989 | 9/1997 | Mao | 395/612 |
| 5,758,346 | 5/1998 | Baird | 707/101 |
| 5,761,668 | 6/1998 | Adamchick | 707/101 |
| 5,797,117 | 8/1998 | Gregovich | 707/101 |

OTHER PUBLICATIONS http://www.hnt.com.au/tdms2000.htm, "TDMS Year2000 Fix".
http://www.Fastfix36.com, "Fast Fix/36 Homepage".
http://www.bridger.link–usa.com/brhm23.htm "Dates for 2000 and Beyond", Brider Systems, Inc.
Zvegintzov,N., "A Resource Guide to Year 2000 Tools", Computer, pp. 58–63, Mar. 1997.
Dick Lefkon, "Seven Work Plans for Year 2000 Upgrade Projects", Comm. of the ACM, May 1997, vol. 10 No. 5, pp. 111–117.
Andrew Eldridge et al., "A Comparison of Procedural and Data Change Options for Century Compliance", http:/// www.year2000.com/archive/options.html.

*Primary Examiner*—Tariq R. Hafiz
*Assistant Examiner*—Kakali Chaki
*Attorney, Agent, or Firm*—Young & Thompson

[57] ABSTRACT

In a computer system (1) having only six positions for representing dates, information on which century that is referred to is contained in one or several of the six positions without changing the date format, a so called Roman format. In a preferred embodiment the information on that a particular date refers to a date in the twenty-first century instead of a date in the twentieth century is included by means of letting the months of the twenty-first century be represented by the numbers 21–32 in contrast to the months of the twentieth century which are represented by the numbers 1–12. This date format, the Roman format, solves a number of problems encountered by the so called millennium problem. Thus, less reprogramming of existing computer systems will need to be performed when using this representation.

7 Claims, 2 Drawing Sheets

DATE FORMAT CONVERSION FOR INCLUDING CENTURY INFORMATION IN A SIX DIGIT DATE REPRESENTATION

TECHNICAL FIELD

The present invention relates to a method and a device for storing and representing dates in a computer system. The method and the device are particularly suitable for use in a computer system employing only six characters for representing a date.

BACKGROUND OF THE INVENTION AND PRIOR ART

In some computer systems, in particular older computer systems, dates are represented by six characters. The representation used indicates the year by two digits corresponding to the last two numbers of the year in question, the month by two digits corresponding to the month (1–12) in question, and the day of the month by two digits corresponding to the day of the month (1–31).

The use of only six characters was employed in order to save memory, which was expensive at the time. Furthermore, it was not expected that the old computer systems should survive into the year 2000.

The standard format for date representation is therefore usually one of YY/MM/DD, MM/DD/YY or DD/MM/YY, where Y represents a year digit, M represents a month digit and D represents a day digit. The representation is thus well suited to represent any date in a certain, for example the twentieth, century.

However, when the century is changed, such a representation can not be used, since it is incapable of determining the difference between dates belonging to different centuries. Also, since the year only has two digits the coming year 2000 will be represented by 00. This will have an unwanted effect on programs which refers to, or uses dates, in different kinds of algorithms or calculations.

A result from such calculations can, for example, be that an entered date 000101 representing the first of January in the year 2000 will, by the computer system, be regarded as an earlier date than 991231 representing the 31 of December 1999. Such effects are, of course, highly undesirable, and would cause large problems in computer systems using this format for representing dates.

In order for the computer systems not to experience such problems, which sometimes are, with a common term, referred to as the millennium problem, the solution up until now has been to reprogram the entire computer system in order to make it cope with the change of millennium.

However, such an approach is, although possible to carry out, very expensive. The total cost for such reprogramming is expected to be several billions US dollars. Moreover, the very large amount of computer code, which has to be altered or reprogrammed, makes the possibility of erroneous reprogramming very high. The result of such erroneous reprogramming is impossible to foresee, and it can take years before it is even noticed.

Another proposed solution to the millennium problem is to change the date format into the representation CYYDDD, where C denotes the century, YY the year, and DDD the day as a number from 1–365 or 366. This proposed method will only solve a part of the problem. A problem which will remain is that most of the computer systems are set to employ one of the standard formats YY/MM/DD, MM/DD/YY or DD/MM/YY and used in that form for different calculations, such as determining the month. Moreover, the standard formats are better suited for display to a user, for whom it will be easier to use the date information, since the day and the month are displayed explicitly.

U.S. Pat. No. 5,630,118 describes a system and a method for carrying out date operations on date fields of different centuries.

U.S. Pat. No. 5,600,836 discloses a system and a method for processing date-dependent information in a two digit format where dates are in one or two centuries.

SUMMARY

It is an object of the present invention to overcome the problems of the so called millennium problem referred to above. In particular it is an object of the present invention to reduce the amount of reprogramming, which is necessary to perform in order to avoid errors to occur in computer systems using only six characters for representing dates.

This object is obtained by means of including information on the century in the already existing six characters, without altering the basic structure of the standard date format (YY/MM/DD, or the like) Thereby forming a new format, the Roman format.

Thus, in a preferred embodiment the days of the next century are not entered as numbers in the range from 1 to 31, but instead, using the Roman format, in the range from 41 to 71.

In another preferred embodiment of the Roman format the months are used for carrying the information on the century. Thus, the months of the twentieth century are numbers from 1–12, whereas the months of the twenty-first century are numbers from 21–32.

By means of incorporating the century information in the standard format, which is done by means of the Roman format, a number of advantages are obtained. Thus, very small adjustments of existing computer systems need to be performed. One necessary adjustment, which may need to be carried out, is to make the computer system accept the new dates in the new intervals.

BRIEF DESCRIPTION OF THE DRAWINGS

The present invention will now be described by way of non-limiting examples and with reference to the accompanying drawings, in which:

FIGS. 3a and 3b are flow charts for handling input and output of dates in the translation units of FIG. 2.

DESCRIPTION OF PREFERRED EMBODIMENTS

Figure 1:
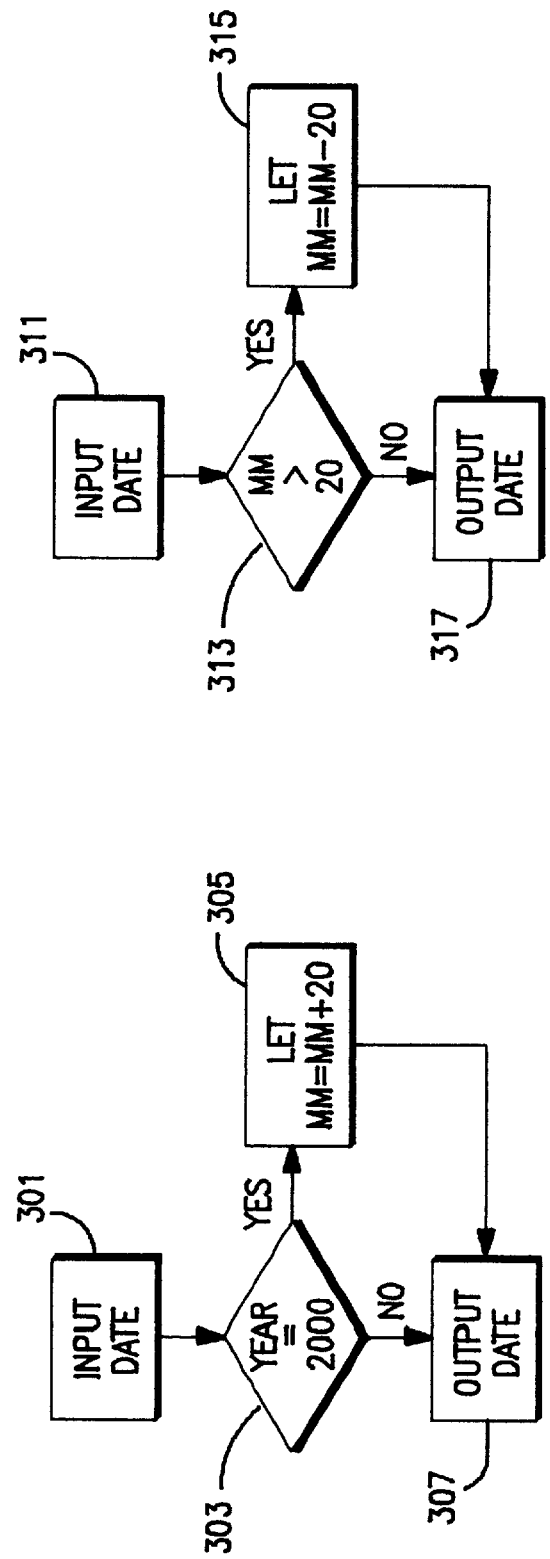
FIGS. 1a–1c illustrates a six-position date representation.

In FIG. 1a, a six-position standard date format, which is common in the U.S.A., is shown. Thus, the date is shown in the format MM/DD/YY, where MM represents the month by means of the numbers 1–12, DD represents the day by means of the number 1–31, and YY represents the year by means of the numbers 0–99. In this format any date within a certain century can be represented.

However, although very useful for humans, this format creates problems in various computer systems, which for example use different sorting routines, since the standard format cannot identify the difference between different centuries.

In FIG. 1b the 31 of December 1999 is written using the above described standard format, i.e. MM/DD/YY, which thus becomes 123199, if this format is used the next date, i.e. the 1 of January 2000, would be written 010100. This would in create many problems in many existing computer systems, since, for example, the 1 of January 2000 would be regarded as earlier than the 31 of December 1999.

Instead, the computer system is modified to accept other month numbers than 1–12, for example also 21–32. The months of the twentieth century would then correspond to the numbers 1–12 and the months of the twenty-first century would correspond to the numbers 21–32. Thus, as shown in FIG. 1c, the 31 of December 1999 is written using the above described standard format, and thus becomes 123199, and the next date, i.e. the 1 of January 2000, would, in this modified format be written 210100.

Figure 2:
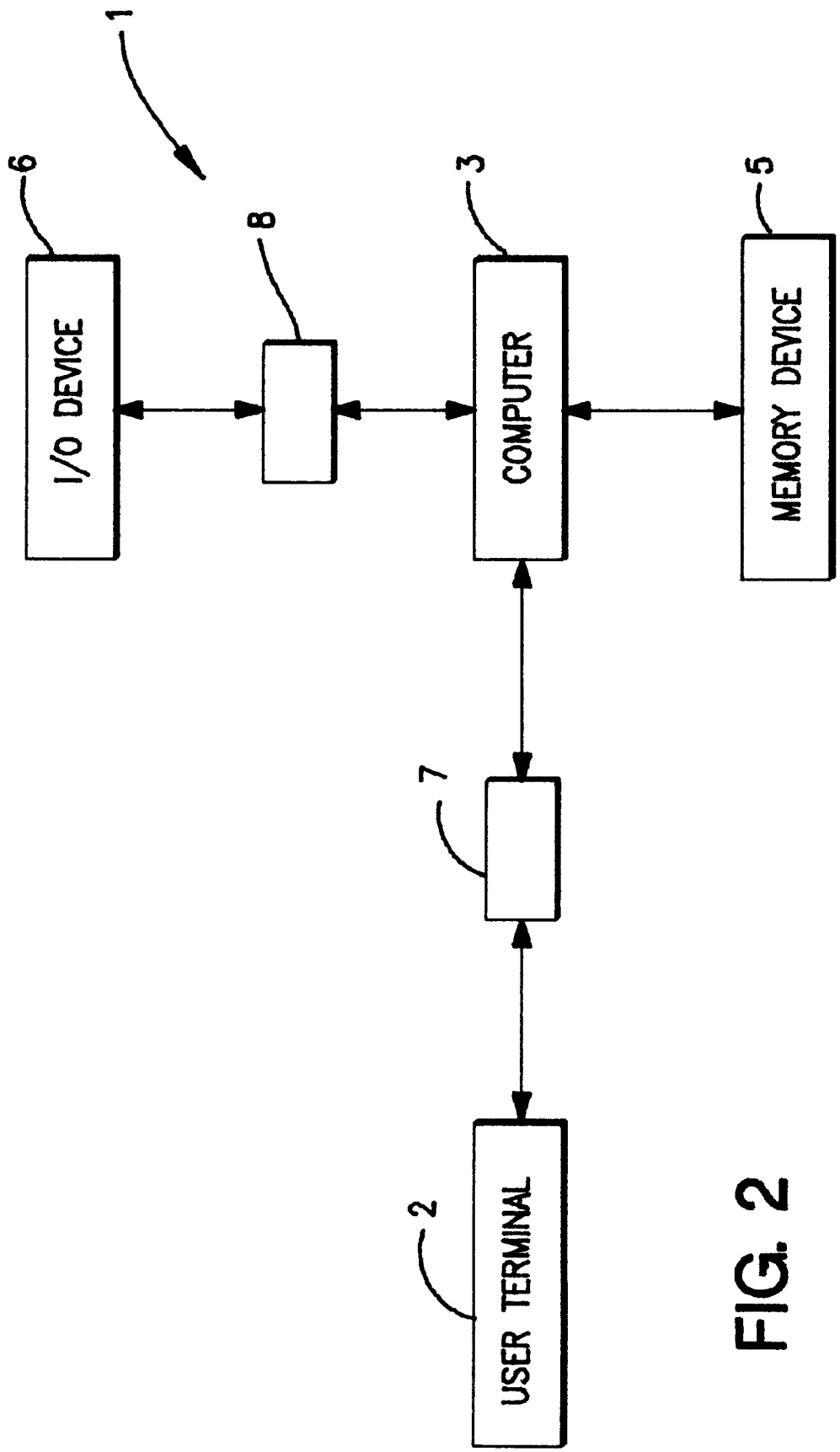
FIG. 2 is a general block diagram of a computer system having translation units.

In FIG. 2, a general block diagram of a computer system 1 is shown. The computer system 1 comprises a user terminal 2, connected to a computer 3, via a translation unit 7, and a Input/output (I/O) device 6 connected to the computer 3 via a translation unit 8, and a memory device 5 also connected to the computer 3.

A date entered into the computer system 1 from the user terminal 2 or I/O device 6 is translated in the translation units 7 or 8 into the format described in conjunction with FIG. 1c and forwarded to the computer 3, which has been made, e.g. by means of reprogramming, to accept dates having a month in the interval 21–32.

An easy way of including the possibility to accept month numbers, which, according to the existing standard format, are invalid, is to add these numbers to a function in the computer which checks for invalid month numbers.

Another possibility, which require some reprogramming of the computer system, but which can be beneficial in some applications, is to reprogram the error routine, which is called upon when such an invalid date is entered into the computer 3, to accept the date as a valid date.

The computer 3 can then use the entered date and perform various calculations, such as comparing it to other dates stored in the memory device 5 for example in order to determine which date is the earliest. When a date is output from the computer via the I/O device or the user terminal 2 the translation units 7 or 8 translate the output date into the correct date.

The use of the translation units 7,8 may not be necessary if the users are familiar with the format described in conjunction with FIG. 1c. Also, in some applications the computer 3 may be replaced by a central processing unit (CPU).

In FIG. 3a, a flow chart of the steps carried out in the translation units 7 and 8, when dates are entered into the computer system 1, are illustrated. Thus, first, in a block 301, a date is entered. Thereupon it is checked in a block 303 if the current date is any of the years 2000–2099. If in the block 303 it is decided that the year is any of the years 2000–2099, the process proceeds to a block 305 in which the month number is increased by 20 and the date is output in a block 307 otherwise the date is directly output in the block 307.

In FIG. 3b, the corresponding output translation, which is performed in the translation units 7 and 8, is shown. Thus, first the date to be output is input in a block 311. The month number of the date. input in the block 311 is then checked in a block 313. If the month number is greater than 20 the month number is reduced by 20, and then output in a block 317 to the user terminal and I/O device, respectively. If the check made in the block 313 determines that the date is lower than 20 no translation is performed and the date is output directly in the block 317.

It is to be understood that it is not necessary for the month to carry the information regarding the century. That information can equally well be carried by the day, e.g. day numbers between 41 and 71 represent days in the twenty-first century whereas the numbers 1–31 represents the days of the twentieth century. The year could also be made to carry this information. However, in that case other characters than digits must be used. For example, each decade of the twenty-first century could be represented by a different letter, so that, A represents the first decade, B the second and so on. The year 2013 would then be written B3.

Also, subsequent centuries can be entered into a computer system, if this should be necessary, by means of the described technique. Thus, if a date in the twenty-second century is desired to be entered into a computer system only having six positions for date representation, as described above, other characters can be used for carrying this information. For example, the month numbers 1–12 are used for the twentieth century, the month numbers 21–32 are used for the twenty-first century, and the month numbers 41–52 are used for the twenty-second century.

The method and system as described herein, which employs the Roman format, significantly reduce the amount of work, and the corresponding cost, when adapting older computer systems to the twenty-first century. In other words, it makes the consequences of the so called millennium problem less damaging.

I claim:

1. A computer-implemented process for converting a date after Dec. 31, 1999 which is stored in a machine-readable medium in a computer, each date being stored as six machine-readable numerical characters where two of the stored characters are a day group, two of the stored characters are a month group, and two of the stored characters are a year group, wherein each of the groups has a ones digit storage position and a tens digit storage position, the method comprising the computer-implemented data processing steps of:

recalling the date stored in the machine-readable medium in the computer;

replacing a numerical character stored in the tens digit storage position in one of the day and month groups of the recalled date with a single new numerical character that represents the replaced character and that indicates that the stored date is after Dec. 31, 1999;

allowing the characters stored in the other groups and the character stored in the ones digit storage position of the one group to continue to directly indicate the last two digits of the year, both digits of one of the month and day, and one digit of the other of the month and the day with correct numerical characters, thereby providing a converted date with only one character that does not directly indicate the date; and reading the converted date, wherein the detection of the single new numerical character indicates that the two digits in the year group are the last two digits of a year after 1999.

2. The process of claim 1, wherein the step of replacing the numerical character stored in the tens digit storage position comprises the step of replacing the character with a single new numerical character that is offset by two from a value of the replaced character when the replaced character is in the month group and offset by four from a value of the replaced character when the replaced character is in the day group.

3. The method of claim 1, wherein the replacing step comprises the step of incrementing the largest possible numerical value of the replaced character by at least one so that the smallest numerical value of the numerical character is larger than the largest possible numerical value of the replaced character.

4. The method of claim 3, wherein the replaced character is a tens digit of the day group.

5. The method of claim 4, wherein the numerical character has a value from 4 to 7, and represents the tens digit of a day of the represented month and indicates that the represented date is after Dec. 31, 1999.

6. The method of claim 3, wherein the replaced character is a tens digit of the month group.

7. The method of claim 6, wherein the numerical character has a value of 2 or 3, and represents the tens digit of a month of the represented year and indicates that the represented date is after Dec. 31, 1999.

\* \* \* \* \*